United States Patent
Klieman

(10) Patent No.: US 9,467,442 B2
(45) Date of Patent: Oct. 11, 2016

(54) AUTOMATED STEP-UP DIGITAL CERTIFICATE INSTALLATION PROCESS

(71) Applicant: Symantec Corporation, Mountain View, CA (US)

(72) Inventor: Michael Klieman, Belmont, CA (US)

(73) Assignee: Symantec Corporation, Mountain View, CA (US)

( * ) Notice: Subject to any disclaimer, the term of this patent is extended or adjusted under 35 U.S.C. 154(b) by 32 days.

(21) Appl. No.: 14/286,815

(22) Filed: May 23, 2014

(65) Prior Publication Data

US 2015/0341342 A1 Nov. 26, 2015

(51) Int. Cl.
*H04L 29/06* (2006.01)
*H04L 9/32* (2006.01)

(52) U.S. Cl.
CPC ............ *H04L 63/0823* (2013.01); *H04L 9/32* (2013.01); *H04L 9/3268* (2013.01); *H04L 63/168* (2013.01)

(58) Field of Classification Search
CPC . G06F 21/00; G06F 21/6209; H04L 63/104; H04L 63/32; H04L 2209/64; H04L 2209/38
USPC ........................................................ 713/153
See application file for complete search history.

(56) References Cited

U.S. PATENT DOCUMENTS

| | | | |
|---|---|---|---|
| 7,275,155 B1 * | 9/2007 | Aull ........................ | H04L 9/00 713/157 |
| 2003/0126431 A1 * | 7/2003 | Beattie ................ | G06F 21/6218 713/156 |
| 2004/0123100 A1 * | 6/2004 | Noyama ............ | B42D 15/0033 713/159 |
| 2005/0078830 A1 * | 4/2005 | Thornton ............ | H04L 63/0823 380/277 |
| 2007/0294431 A1 * | 12/2007 | Adelman ............. | G06Q 10/107 709/245 |
| 2008/0010450 A1 * | 1/2008 | Holtzman ............. | H04L 9/3228 713/157 |
| 2013/0318354 A1 * | 11/2013 | Entschew ............. | G06F 21/645 713/175 |
| 2013/0346747 A1 * | 12/2013 | Ignatchenko ......... | H04L 9/3268 713/158 |

OTHER PUBLICATIONS

CA/Browser Forum, Guideliens for the Issuance and Management of Extended Validation Certificates Version 1.2 as adopted Oct. 1, 2009, p. 43 12.2.2.*
CA/Browser Forum, "Guidelines for the Issuance and Management of Extended Validation Certificates Version 1.2", as adopted Oct. 1, 2009, pp. 43 par. 12.2.2.*

(Continued)

*Primary Examiner* — Roderick Tolentino
*Assistant Examiner* — Harvey Cohen
(74) *Attorney, Agent, or Firm* — Patterson + Sheridan, LLP

(57) ABSTRACT

Techniques are disclosed for rapidly securing a server in response to request for a high-assurance digital certificate. As described, a CA may issue a basic tier certificate after performing a verification process to confirm that a party requesting a certificate for a given network domain, in fact, has control of that domain. Once issued and provisioned on the server, the server can establish secure connections with clients. At the same time, the CA continues to perform progressive identity verification processes for progressively higher tiers of certificates. Once the identity verification process at each tier is complete, the CA issues a new certificate for the corresponding tier, which may then be provisioned on the server. After performing all of the identity verification processes, the server can issue the requested high-assurance certificate.

18 Claims, 6 Drawing Sheets

(56) References Cited

OTHER PUBLICATIONS

Geldenhuys et al., "A Digital Signature Issuing and Verification System for Auto Identification Tokens", WiCOM, 2012, pp. 1-7.*
Levi et al., Use of Nested Certificates for Efficient Dynamic and Trust Preserving Public Key Infrastructure, AC< TOSSEC, vol. 7 Issue 1, Feb. 2004.*
Liu et al., Certificate Based Sequential Aggregate Signature, Mar. 2009, WiSec09: Proceedings of the second ACM conference on Wireless network security, ACM.*
Roy-Chowdhury, et al., A Lightweight Certificate-based Source Authentication Protocol for Group Communications in Hybrid Wireless/Satellite Networks, 2008, IEE Globecom 2008—2008 IEEE Global Telecommunications Conference, pp. 1-6, DOI: 10.1109/GLOCOM.2008.ECP.367.*

* cited by examiner

AUTOMATED STEP-UP DIGITAL CERTIFICATE INSTALLATION PROCESS

BACKGROUND

1. Field

Embodiments presented herein provide an automated step-up process for installing and provisioning a high-assurance certificate on a computer server. More specifically, embodiments presented herein reduce the time needed to secure a server by serially installing multiple certificates while completing the identity verification and authentication required for the high-assurance certificate.

2. Description of the Related Art

Providing secure communications and protecting sensitive data is a well known issue in a broad variety of contexts. For example, it is common for computer servers to use digital certificates to associate a server with a network domain. In such cases, clients use information contained in a certificate to verify the identity of a server and to establish a secure network connection with that server. Other applications use digital certificates to help manage encrypted data. For example, a database may be configured with a digital certificate specifying a key used to encrypt data (or used to create encryption keys) stored by the database.

Digital certificates are issued by a certificate authority (CA) after a requesting party completes an enrollment process. As part of the enrollment process, the requesting party provides the CA with a public key to be named in the certificate and with information used to verify the identity of the requesting party (and in some cases the authority to request the certificate). The public key corresponds to a private key that needs to be maintained securely by the requesting party. The certificate, once issued, binds the public key to information listed in the certificate—such as the name of a network domain.

Certificate authorities perform varying levels of identify investigation and authentication when issuing a digital certificate For example, SSL certificates (used to secure a communication channel between a web server and client) are differentiated by the degree which the certificate authority has vetted the identity of an organization named in the SSL certificate. Depending on the specific certificate purchased (and the associated level of authentication required), the time required to perform the identity verification varies. For example, some certificates can be issued almost immediately, after verifying that a requesting party has control of a network domain named in a certificate. In contrast, CA typically performs more extensive identity verification before issuing a "high-assurance" certificate, where the CA verifies the organization requesting the certificate or the authority of an individual within the organization to make the request. However, doing so can delay the delivery of a requested certificate and the time before a customer can secure a given computer server.

SUMMARY

One embodiment presented herein includes a method for issuing digital certificates to a requesting party. This method may generally include receiving, by a certificate authority, a request for a digital certificate having a specified certificate type and performing an initial identity validation process associated with an initial tier of digital certificates issued by the certificate authority. Upon successfully completing the initial identity verification process, the CA issues a digital certificate with a certificate type corresponding to the first tier. The CA then performs one or more subsequent identity verification processes. Each subsequent identity verification process is associated with a subsequent tier of digital certificates issued by the certificate authority. As each subsequent identity verification process is completed successfully, the CA issues a digital certificate corresponding to the subsequent tier, until successfully completing an identity verification process associated with the specified certificate type and issuing a digital certificate having the specified certificate type.

In a particular embodiment, the initial tier of digital certificates are Domain Validation (DV) certificates. In such a case the initial identity verification process comprises receiving an indication verifying that the requesting party controls a network domain to be named in the DV certificate. Further, a first subsequent tier of digital certificates may be Organization Validation (OV) certificates. In such a case, the subsequent identity verification process associated with the first subsequent tier of digital certificates may include receiving a verification that an organization to be named in the OV certificate exists as stated in enrollment data provided by the requesting party. Further still, a second subsequent tier of digital certificates may be Extended Validation (EV) certificates. In such a case, the subsequent identity verification process associated with the second subsequent tier of digital certificates may include receiving a verification that an individual submitting the request on behalf of an organization to be named in the OV certificate is authorized by the organization to submit such a request.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
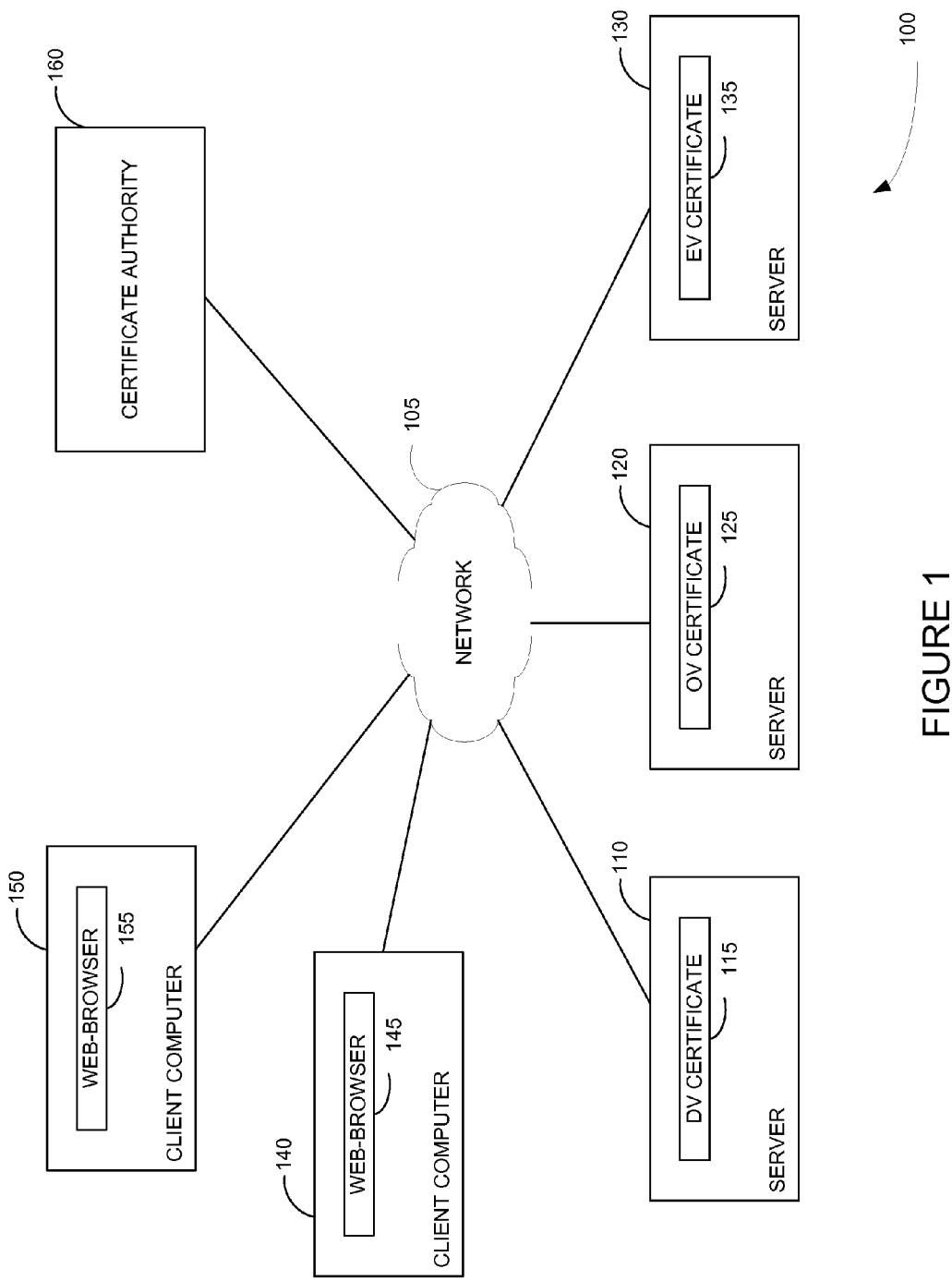
FIG. 1 illustrates an example computing environment, according to one embodiment.

Embodiments presented herein provide techniques for rapidly issuing a digital certificate while completing a vetting process needed to issue a high-assurance digital certificate. In one embodiment, a certificate authority (CA) receives an enrollment request from a party wishing to obtain and a digital certificate to install on a server. In response, the CA performs an identity verification process before issuing the digital certificate. Depending on the requested certificate, the identity verification process can vary. For example, a CA may offer certificates at increasing tiers or levels, where the verification process at each tier includes everything done at any lower tiers plus some additional verification processes. For example, the identity verification process can start at a first tier where basic domain validation occurs (does the requestor have control of the domain in question?). At a second tier, the CA may perform a business authentication process (is the business requesting the certificate a legitimate organization in good standing in their jurisdiction?). At a third tier, the CA may vet the authority of the individual to request a certificate (is the individual requesting certificate on behalf of the organization authorized to do so?).

In one embodiment, the CA may use an automated certificate signing request (CSR) and installation process to issue multiple certificates to a requesting party as the identity verification process performed at each tier is completed. For example when a party requests a high-assurance certificate, the CA may process the order as if a basic or first tier certificate had been ordered (e.g., a Domain Validation (DV) certificate). Issuing the DV certificate may be an automated process and result in a near instant issue. The DV certificate is then delivered to the requesting client, where it may be installed on a server. At the same time, the CA continues to perform the authentication processes for the second tier certificate. Once the second tier identity verification is complete, the CA creates a new certificate using the CSR sent by the client. Alternatively, the CA may trigger the client to generate a new CSR. In response, the CA issues a second tier certificate (e.g., an Organization Validation (OV) certificate). The client can then replace the DV certificate on the server with the OV certificate. Such a certificate may include a security-seal or site-seal, providing additional proof of authenticity to clients. Once the OV certificate is issued, the security seal is activated with the CA.

After issuing the OV certificate, the CA performs the additional validation procedures needed for a third-tier certificate (e.g., an Extended Validation (EV) certificate). Once complete, the CA can again use the CSR to generate the third-tier certificate (or trigger the client to generate and send a CSR to the CA). The CA then issues the EV certificate, which can replace OV certificate on the server. Once this occurs any secondary features tied to prior levels of authentication may be disabled through the progression from an OV to an EV certificate, e.g., a security seal associated with an OV certificate could be disabled. Similarly, any secondary features tied to a current level of authentication may be enabled.

When the EV certificate is presented to clients, a browser can provide a visual indication that the connection to a given network domain has been secured using a high-assurance certificate. By issuing certificates using an automated step-up process while the identity verification requirements for each tier are performed, a client can request a high-assurance certificate and rapidly secure a server without having to wait for the full authentication process to be completed.

In one embodiment, configurable rules may allow both the client and CA to specify how and when certificates of different types or tiers get installed and replaced on a server. For example, the client could specify that no certificate below a certain tier should be installed during step up process (e.g., a client could specify to only use a OV certificate before stepping up to an EV certificate). Additionally, rules may allow a user (or CA) specify whether the step-up process should be used to replace an expired (or revoked) high-assurance certificate. Other rules may govern whether (and to what extent) the step-up process should be used for a subsequent issuance of a new certificate for a new domain or new corporate entity, for a renewal of an existing certificate, for a reissuance of an existing certificate (e.g. to get another certificate for use on an additional server), for a replacement of an existing certificate (e.g., due to a potential compromise, a change in information specified in a certificate), and for a change to the security elements of the certificate (e.g., key length, hashing algorithm, signing algorithm, etc.).

Note, embodiments are described below using Domain Validation (DV) certificates, Organization Validation (OV) certificates, and Extended Validation (EV) certificates as a reference example of a multiple certificate tiers, where the identity authentication and investigation process is progressively more detailed (and potentially time consuming) at each tier. However, one of ordinary skill in the art will recognize both that these certificate types (and corresponding identity investigation and authentication processes at each tier) provide an example of commercially available certificate tiers and that embodiments may be adapted for use with other tiered schemes (or progressive authentication processes) as needed for a particular case. Further, this approach can be applied to any certificate with varying degrees of authentication, including e.g., SSL/TLS certificates, Code Signing certificates, and Client certificates.

FIG. 1 illustrates an example computing environment 100, according to one embodiment. As shown, the computing environment 100 includes server 110, server 120, and server 130, each connected to a network 105 (e.g., the internet). Server 110 has been provisioned with a Domain Validation (DV) certificate 115. Server 120 has been provisioned with an Organization Validation (OV) certificate 125. Server 130 has been provisioned with an Extended Validation (EV) certificate 135. Certificates 115, 125, and 135 are issued by certificate authority (CA) 160 over network 105. To do so, the CA 160 performs a progressive identity verification process to issue the DV certificate 115, OV certificate 125, and EV certificate 135. In one embodiment, the CA 160 issues OV certificate 125 and EV certificate 135 using an automated step-up process, where the CA completes the identity verification process, and issues a corresponding certificate, for each progressive tier of certificate types, as described in more detail below. Once installed, a web-browser 145, 155 on client computers 140, 150, respectively, can establish a trusted, secure connection with servers 110, 120, and 130 over network 160.

Figure 2:
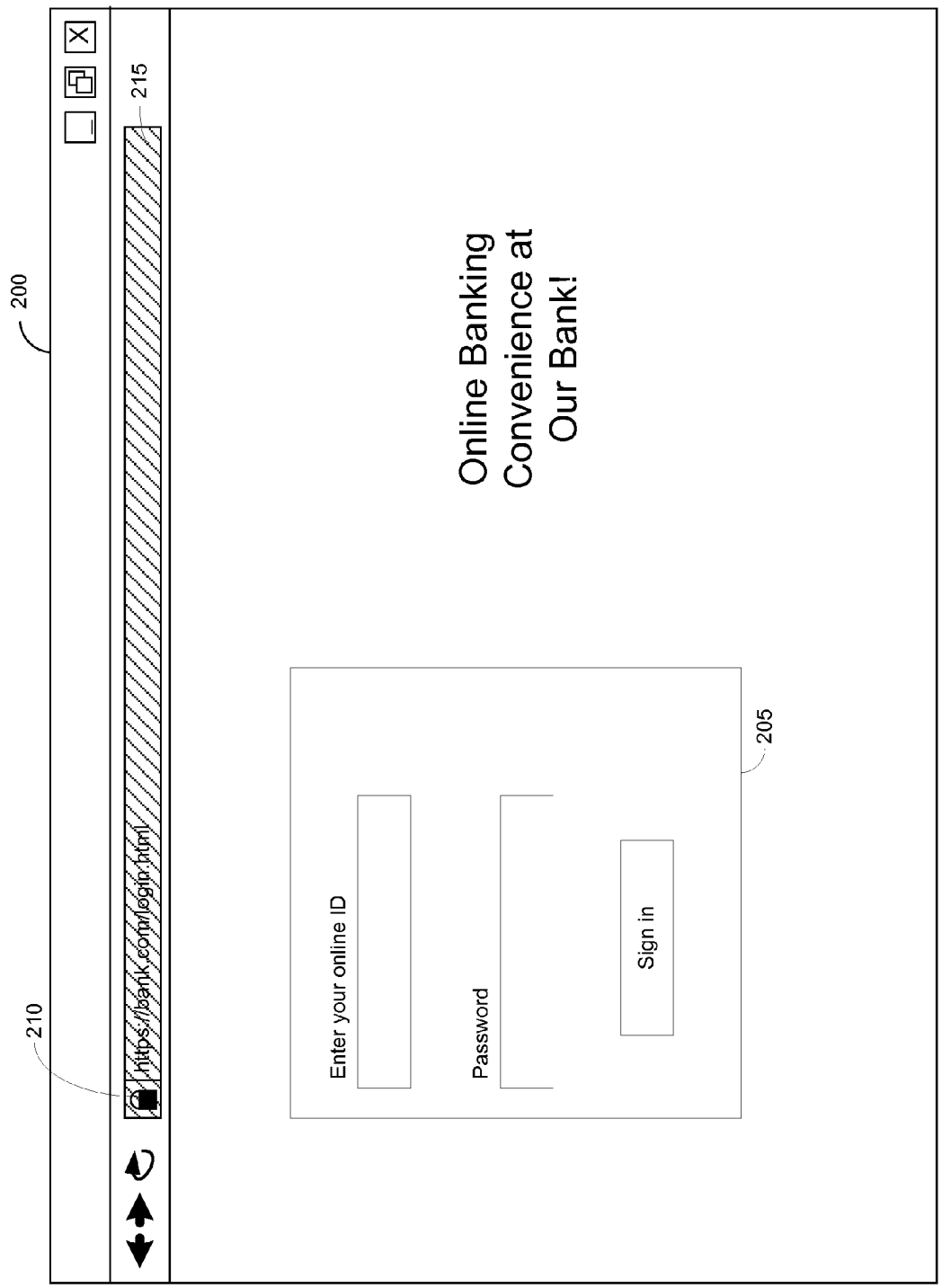
FIG. 2 shows an example web-browser interface with a visual indicator that a web-server has been secured with a high-assurance digital certificate, according to one embodiment.

As known, the behavior of web-browsers 145, 155, may vary depending on whether a server presents a DV, OV, or EV certificate to establish a secure connection (e.g., an SSL session). In turn, different web-browsers may present a visual indication that a server is verifying itself using a high-assurance certificate. For example, FIG. 2 shows an example web-browser interface 200 with a visual indicator that a web-server has been secured with a high-assurance digital certificate (e.g., an EV certificate), according to one embodiment. As shown, interface 200 purports to be a login interface 205 for a online banking website. The login interface 205 requests a user to supply credentials (a username and password) to access an account. For this example assume the domain "bank.com" has been secured using an EV certificate. In response, the browser rendering interface 200 shows a lock icon 210, shown for any secure connection established using a trusted certificate.

However, the address bar 215 shows an additional visual indicator that the certificate presented by the server at "bank.com" has both been validated by the browser and is an EV certificate. In this case, the address bar 215 is rendered using a green highlighting, indicating to the user that the site is secured using an EV certificate. Doing so informs the user that the site "bank.com" has undergone an extended identity verification processes to confirm both that the requesting party (1) has control of the domain (domain validation), (2) is a legitimate organization (organization validation), and (3) that the person requesting a certificate is authorized to do so on behalf of the organization (extended validation).

Figure 3:
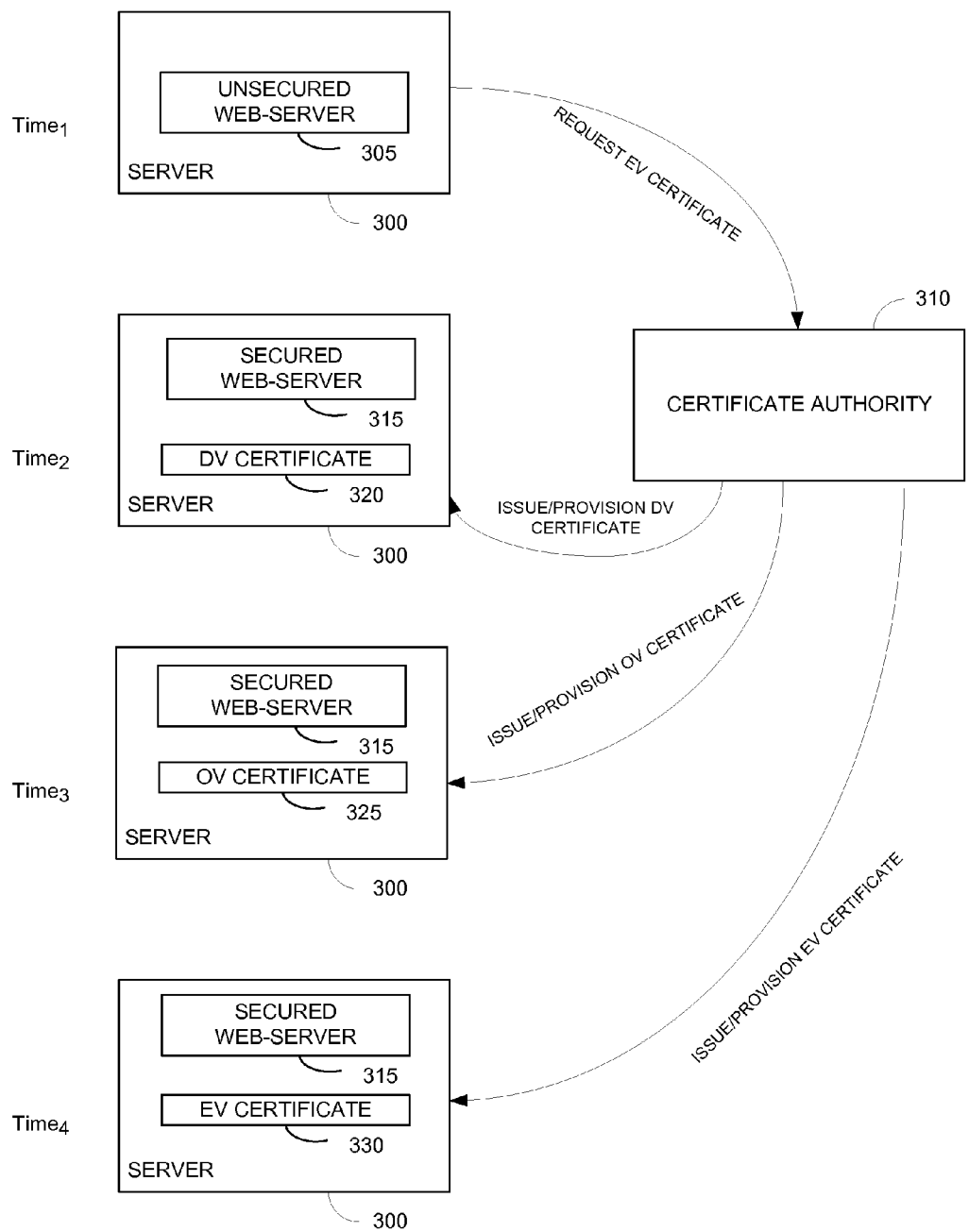
FIG. 3 illustrates a time sequence for serially installing multiple certificates while completing an identity verification and authentication process for a high-assurance digital certificate, according to one embodiment.

As noted, in one embodiment, a certificate authority may use an automatic step-up process to issue an EV certificate, where certificates at each of multiple tiers are issued and configured on a server as progressive stages of an identity verification process required for the EV certificate are completed. FIG. 3 illustrates a time sequence for serially installing multiple certificates while completing an identity verification and authentication process for a high-assurance digital certificate, according to one embodiment.

As shown, at time 1, a server 300 is running an un-secured web-server 305. That is, the web-server 305 has not been provisioned with a digital certificate in order to establish secure connections with clients. Accordingly, a system administrator may use the server 300 to initiate an enrollment process with certificate authority (CA) to obtain an EV certificate.

In one embodiment, the server 300 may be configured with a software component that automates the process of generating a private/public key pair, generating Certificate Signing Requests (CSRs), and provisioning a certificate on web-server 305. Further, when the administrator completes the enrollment process requesting the EV certificate, the CA 310 may cause the software component to generate a key pair and send the public key to the CA 310 in a CSR. In response, the CA 310 may perform a domain validation process and issue a DV certificate. The domain validation may be performed by the CA 310 to verify that the requesting party in fact has control over the network domain to be named in the DV certificate. For example, the administrator may place certain information in the DNS record associated with the network domain or place a file in the web-server directory retrieved by the CA. Similarly, the CA may contact an individual named in the WHOIS record for a given domain. The verification process associated with a DV certificate may be largely automated, allowing a DV certificate to be issued almost immediately following the enrollment process.

This result is shown at time 2, where server 300 now has a DV certificate 320 used to secure web server 315. After completing the verification process for a DV certificate, the CA 310 performs a validation process needed to issue an organization validated (OV) certificate. To do so, the CA may contact a governmental authority to confirm that the enrolling organization exists, is in good standing, and that the information on record matches what was provided with the enrollment data. For example, for a business organized under U.S. law of a given state, an agent at the CA 310 may contact the office of the Secretary of State for that state. In some cases, such an office may make the needed information available online, in such cases, the OV validation may even be automated by the CA 310. In other cases, particularly for an entity organized outside of the United States, the OV verification may take substantially longer. In any case, while the OV verification process is performed, server 300 remains secured using the DV certificate 320. Once complete, the CA 310 issues an OV certificate 325. For example a site-seal (a graphic image that a customer can post on a website) may differ depending on whether the customer had DV versus OV/EV authentication completed. In such a case, the site seal may be replaced along with the certificate as the CA progressively completes the authentication processes. More generally, any secondary features associated with a prior level of authentication are disabled and any secondary features associated with a current level of authentication are enabled.

At time 3, server 300 now has an OV certificate 325 used to secure web server 315. After completing the verification process for an OV certificate 325, the CA 310 performs a validation process needed to issue an Extended Validation (EV) certificate. To do so, the CA 310 may verify that the individual requesting a certificate on behalf of the organization has authority to do so. For example, the CA may require statements form authorized individuals at the organization (e.g., a director). Because this process may require actual content with an individual at the organization, the time required for extended validation may vary—again particularly when the organizations in foreign jurisdictions. Note, criteria for issuing OV and EV certificates are discussed in detail in Guidelines for Extended Validation, published be the CA/Browser Forum.

In any case, while the EV verification process is performed, server 300 remains secured using the OV certificate 325. Once complete, the CA 310 issues an EV certificate 330. This result is shown at time 4, where server 300 now has an EV certificate 330 used to secure web server 315.

Figure 4:
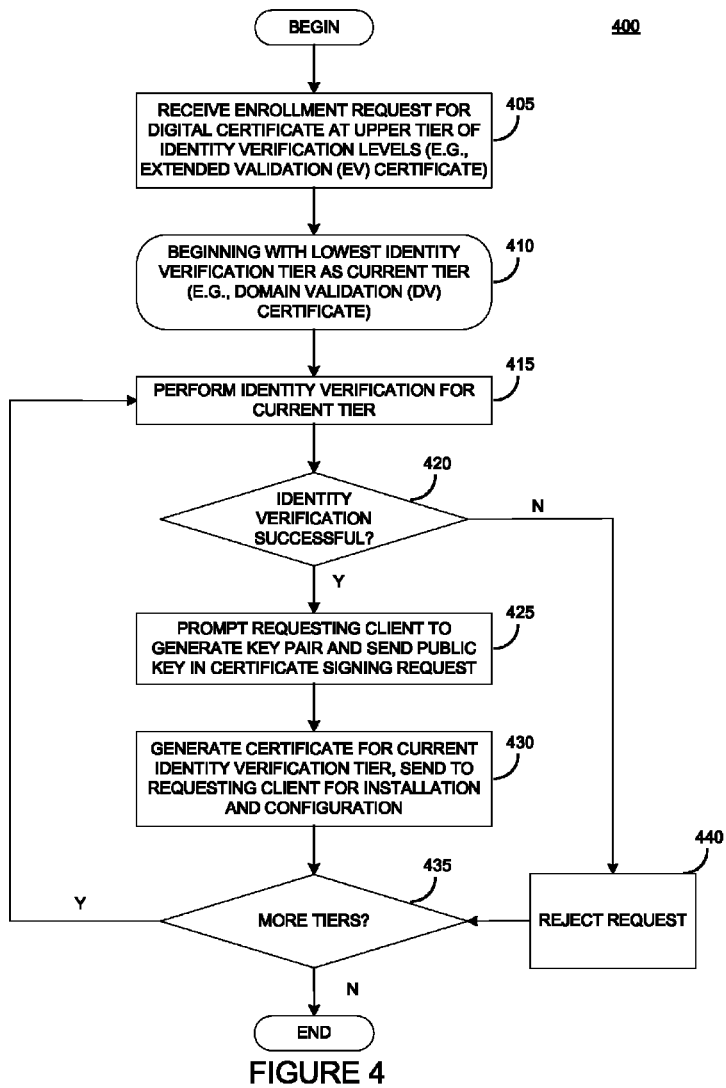
FIG. 4 illustrates a method for issuing a high-assurance digital certificate using an automatic step-up process, according to one embodiment.

FIG. 4 illustrates a method 400 for issuing a high-assurance digital certificate using an automatic step-up process, according to one embodiment. As shown, the method 400 begins at step 405, where a CA receives an enrollment request for a high-assurance certificate, such as the EV certificate 330 discussed above relative to FIG. 3. After receiving the enrollment data, a loop begins where the CA performs progressive stages of an extended validation process. At each progressive stage, the CA issues a certificate for a current tier and initiates the additional validation processes needed for the next tier.

At step 410, the CA begins with the lowest identity verification tier, e.g., a Domain Validation (DV) certificate as the initial current tier. At step 415, the CA performs an identity verification process for the current tier. As noted, basic domain validation may confirm that the party supplying the enrollment data (step 405) has control of the network domain to be named in a digital certificate issued pursuant to the request. If the identity verification process is successful (step 420), then the CA may prompt the requesting party to generate a key pair and send the resulting public key to the CA in a CSR (step 425). Alternatively, the CA may reuse the CSR (and public key) sent for the lowest identity verification tier. At step 430, the CA issues a certificate corresponding to the current identity validation tier and sends this certificate to the client for configuration and installation.

Of course, if the identity verification process fails (step 420), then the CA may abort the step-up process and reject the request for an EV certificate (step 440). If this happens, the CA may also have rules about whether any lower-tier certificates should be revoked as well. That is, assume a requesting party satisfies the domain validation process but fails the Organization Validation (OV) process. In such a case, the CA may revoke the DV certificate (depending on the policy of the CA). More generally, if the authentication process fails at any given stage, any issued certificates can be revoked, depending on the reasons why the authentication process failed. For example, if necessary information cannot be obtained for an EV certificate, a DV certificate may remain valid. In contrast, if in contacting an HR department an issuing CA determines that the requestor is not authorized, then a DV/OV certificate would likely be revoked.

At step 435, the CA determines if there are more progressive tiers of identity verification to perform (and corresponding certificates to issue). If so, the method returns to step 415, where the CA performs the identity verification process for the next progressive tier and, if completed successfully, prompts the server to generate a key pair and submit a CSR (step 425). In an alternative embodiment, the CA may issue a new certificate using the same private/public key pair submitted in a CSR for a lower tier certificate. For example, the CA may use the CSR submitted for the DV certificate to generate an OV certificate (and later an EV certificate). In addition, the CA may also revoke the validity of a certificate issued for a prior tier. For example, after issuing an OV certificate, the CA may revoke the validity of a previously issued DV certificate. For example, as an alternative to actively revoking a prior tier certificate, certificates issued during the step-up process may have a relatively short validity period (e.g., 1-2 weeks) until reaching the final tier.

Once the identity verification process for each tier has been performed (step 415) and corresponding certificate issued and configured (step 430), the method 400 ends.

Figure 5:
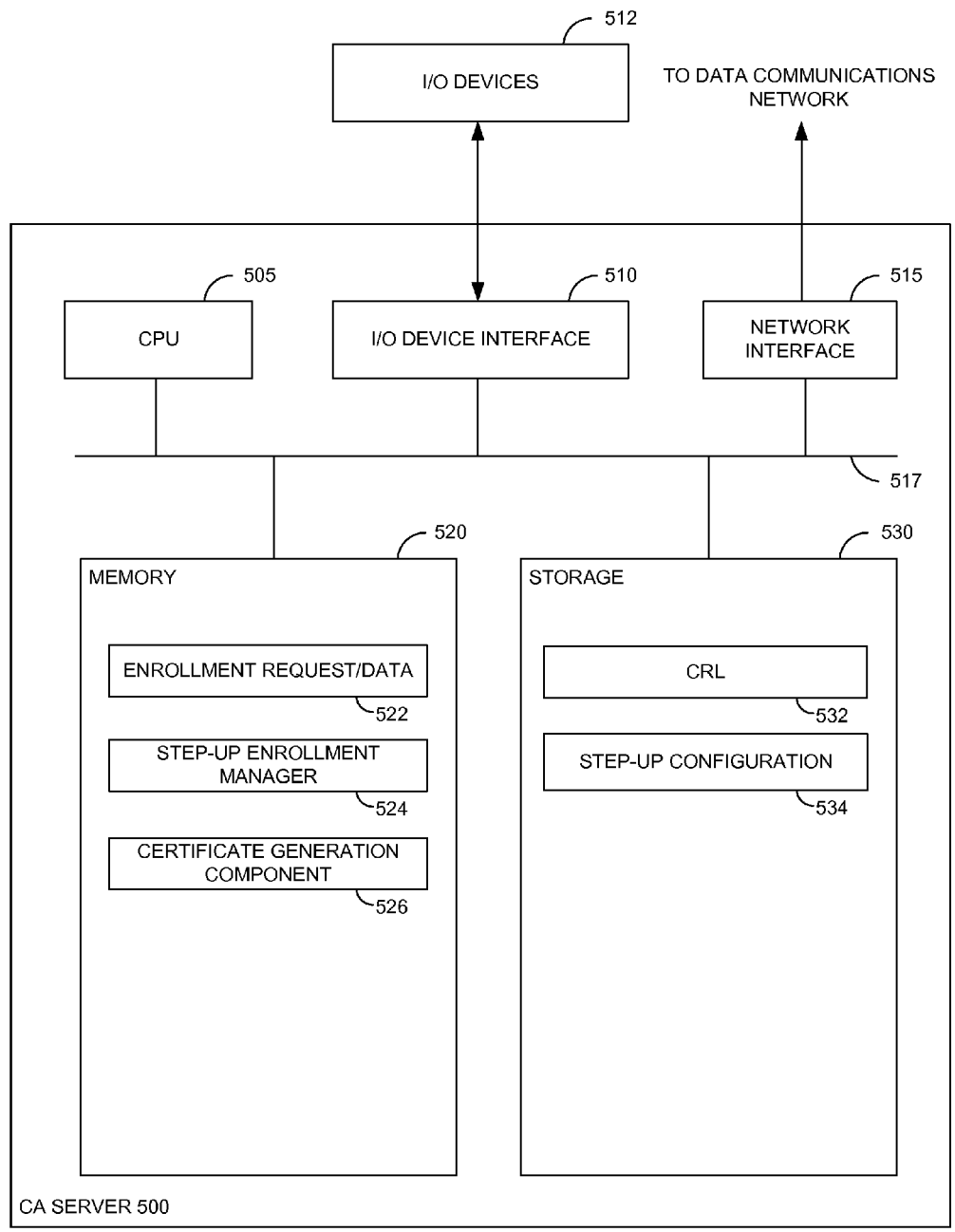
FIG. 5 illustrates an example certificate authority server configured to perform an automatic step-up process to install a high-assurance certificate on a computer server, according to one embodiment.

FIG. 5 illustrates an example certificate authority server 500 configured to perform an automatic step-up process to install a high-assurance certificate on a computer server, according to one embodiment. As shown, computing system 500 includes, without limitation, a central processing unit (CPU) 505, a network interface 515, a memory 520, and storage 530, each connected to a bus 517. Computing system 500 may also include an I/O device interface 510 connecting I/O devices 512 (e.g., keyboard, display and mouse devices) to the computing system 500. Further, in context of this disclosure, the computing elements shown in computing system 500 may correspond to a physical computing system (e.g., a system in a data center) or may be a virtual computing instance executing within a computing cloud.

CPU 505 retrieves and executes programming instructions stored in memory 520 as well as stores and retrieves application data residing in the storage 530. The bus 517 is used to transmit programming instructions and application data between CPU 505, I/O devices interface 510, storage 530, network interface 515, and memory 520. Note, CPU 505 is included to be representative of a single CPU, multiple CPUs, a single CPU having multiple processing cores, and the like. Memory 520 is generally included to be representative of a random access memory. Storage 530 may be a disk drive storage device. Although shown as a single unit, storage 530 may be a combination of fixed and/or removable storage devices, such as fixed disc drives, removable memory cards, or optical storage, network attached storage (NAS), or a storage area-network (SAN).

Illustratively, memory 520 includes certificate enrollment requests and data 522, step-up enrollment manager 524, and a certificate generation component 526. And storage 530 includes a certificate revocation list and step-up confirmation rules 534. The enrollment requests and data 522 correspond to information received from (or obtained to verify the identity of) a given party requesting a digital certificate from the CA. For example, a requesting party may provide the name of a network and related information to be named in a digital certificate, along with information used to vet the request. In response, the CA may obtain some validation information programmatically, e.g., where the CA performs a domain validation process by retrieving DNS information for a given network domain that indicates a requesting party has control of that domain. Other information may be obtained by agents at the CA, e.g., where the CA contacts an Office of the Secretary of State for a given state to verify the existence and good standing of a business entity requesting a certificate for a given network domain.

The step-up enrollment manager 524 may provide one or more software applications used to manage the step-up enrollment process (e.g., the method 400 illustrated in FIG. 4). For example, the step-up enrollment manager 524 may manage the progressive identity verification and issuance of certificates through multiple tiers. Certificate generation component 526 provides software components used to issue a digital certificate after receiving a CSR from a client system. Certificate revocation list (CRL) 532 provides a list of certificates issued by the CA, which have been revoked prior to expiring. For example, the step-up enrollment manger 524 may also revoke the validity of a certificate issued for one tier, after completing the enrollment process and issuing a certificate for a subsequent tier.

Step-up configuration 534 provides a set of configuration rules for managing the step-up enrollment process described above, as well as rules governing whether (and to what extent) the step-up process should be used for a subsequent issuance of a new certificate for a new domain or new corporate entity, for a renewal of an existing certificate, for a reissuance of an existing certificate (e.g. to get another certificate for use on an additional server), for a replacement of an existing certificate (e.g., due to a potential compromise, a change in information specified in a certificate), and for a change to the security elements of the certificate (e.g., key length, hashing algorithm, signing algorithm, etc.).

Figure 6:
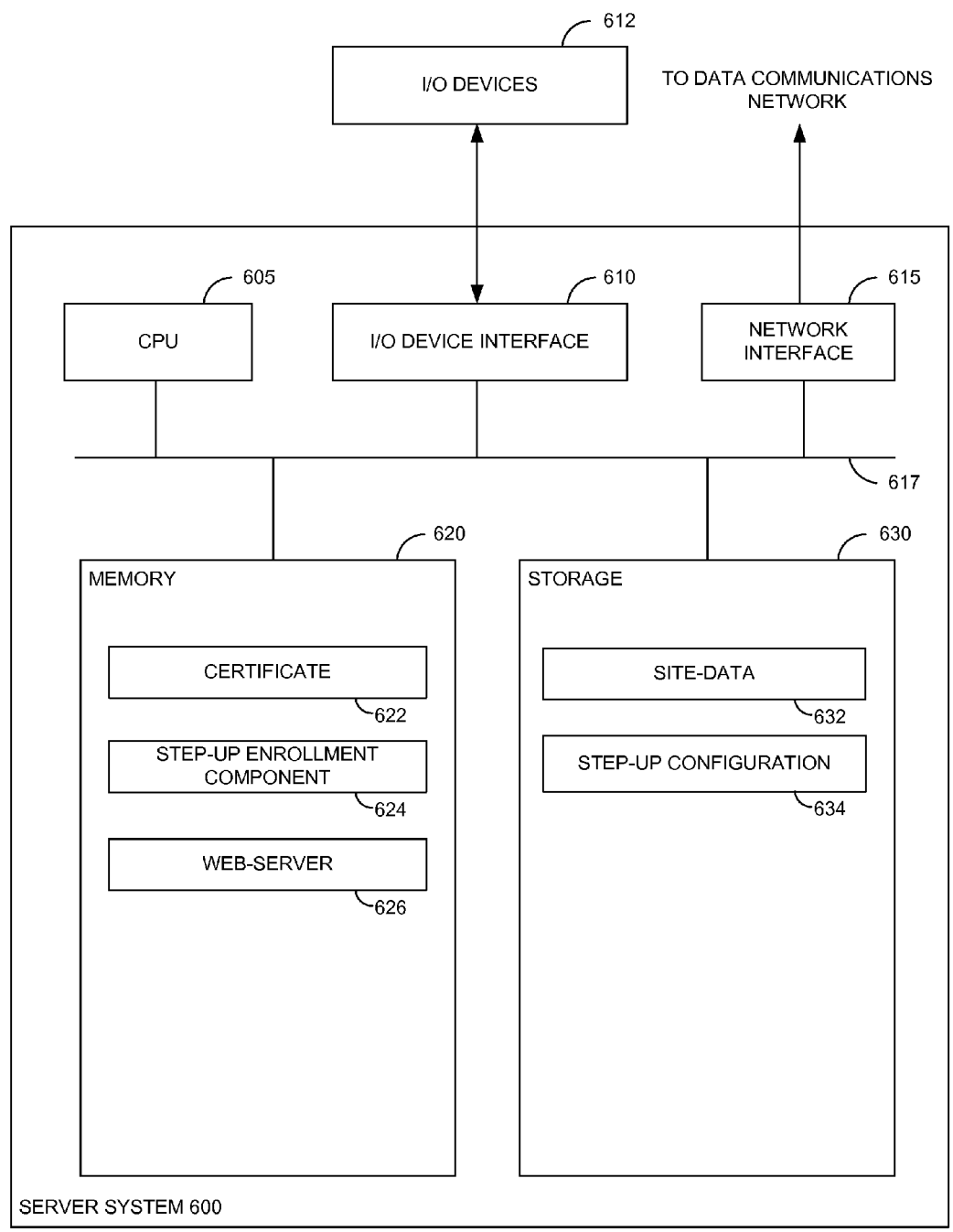
FIG. 6 illustrates a computer server secured using an automatic step-up process to install and provision a high-assurance digital certificate, according to one embodiment.

FIG. 6 illustrates a computer server 600 secured using an automatic step-up process to install and provision a high-assurance digital certificate, according to one embodiment. As shown, computing system 600 includes, without limitation, a central processing unit (CPU) 605, a network interface 615, a memory 620, and storage 630, each connected to a bus 617. Computing system 600 may also include an I/O device interface 610 connecting I/O devices 612 (e.g., keyboard, display and mouse devices) to the computing system 600. Further, in context of this disclosure, the computing elements shown in computing system 600 may correspond to a physical computing system (e.g., a system in a data center) or may be a virtual computing instance executing within a computing cloud.

CPU 605 retrieves and executes programming instructions stored in memory 620 as well as stores and retrieves application data residing in the storage 630. The interconnect 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes a digital certificate 622, a step-up enrollment component 624, and a web-server 626. And storage 630 includes site-data 632 and step-up configuration rules 634. Digital certificate 622 is used to allow web-server 626 to establish secure connections with clients and respond to client requests for site-data 632 (e.g., web content).

Step-up enrollment component 624 corresponds to one or more software applications used to interact with a CA to complete the step-up enrollment process described herein. For example, the step-up enrollment component 624 may be configured to generate key pairs and certificate signing requests (CSRs) sent to the CA as progressive stages of identity verification are completed. The step-up enrollment component 624 may also be configured to install, configure, and otherwise provision digital certificate 622 for use by the web-server 626 during the step-up process. Step-up configuration rules 634 specify rules governing whether (and to what extent) the step-up enrollment process should be used during (or following) the initial enrollment process.

Embodiments discussed herein provide techniques for rapidly securing a server in response to request for a high-assurance digital certificate. As described, a CA may issue a basic tier certificate after performing a verification process to confirm that a party requesting a certificate for a given network domain, in fact, has control of that domain. Once issued and provisioned on the server, the server can establish secure connections with clients. At the same time, the CA continues to perform progressive identity verification processes for progressively higher tiers of certificates. Once the identity verification process at each tier is complete, the CA issues a new certificate for the corresponding tier, which may then be provisioned on the server. In addition, the prior tier certificate may be revoked (or have a short validity period, allowing to subsequently expire). After performing all of the identity verification processes, the server can issue the requested high-assurance certificate. Advantageously, doing so allows the party requesting the certificate to rapidly secure a server while waiting for the progressive identity verification processes to be completed.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet. In context of the present disclosure, certificate authority services (e.g., the CA server and step-up enrollment process) and the server participating in the step-up enrollment process (e.g., an enrolling party's web-server) may be situated in virtual computing instances executing in service provider's computing cloud.

While the foregoing is directed to embodiments of the present invention, other and further embodiments of the invention may be devised without departing from the basic scope thereof, and the scope thereof is determined by the claims that follow.

What is claimed is:

1. A computer-implemented method for issuing a sequence of digital certificates to a requesting party, the method comprising:

in response to receiving, by a certificate authority, via a processor, a request for a digital certificate having a specified certificate type:
performing an initial identity verification process associated with an initial tier of digital certificates issued by the certificate authority, wherein the initial tier of digital certificates precedes a tier associated with the specified certificate type,
upon successfully completing the initial identity verification process, issuing a digital certificate with a certificate type corresponding to the initial tier,
performing one or more subsequent identity verification processes, wherein each subsequent identity verification process is associated with a subsequent tier of digital certificates issued by the certificate authority, and
upon successfully completing each subsequent identity verification process, issuing a digital certificate corresponding to the subsequent tier, until successfully completing an identity verification process associated with the specified certificate type and issuing a digital certificate having the specified certificate type, wherein each digital certificate is provisioned on a server having a network domain and allows the server to establish secure network connections.

2. The method of claim 1, wherein the initial tier of digital certificates comprise Domain Validation (DV) certificates and wherein the initial identity verification process comprises receiving an indication verifying that the requesting party controls the network domain to be named in the DV certificate.

3. The method of claim 1, wherein a first subsequent tier of digital certificates comprises Organization Validation (OV) certificates and wherein the subsequent identity verification process associated with the first subsequent tier of digital certificates comprises receiving a verification that an organization to be named in the OV certificate exists as stated in enrollment data provided by the requesting party.

4. The method of claim 1, wherein a second subsequent tier of digital certificates comprises Extended Validation (EV) certificates and wherein the subsequent identity verification process associated with the second subsequent tier of digital certificates comprises receiving a verification that an individual submitting the request on behalf of an organization to be named in the OV certificate is authorized by the organization to submit the request.

5. The method of claim 1, further comprising, after completing one of the subsequent identity verification processes and issuing the digital certificate corresponding to the associated tier of digital certificates, revoking a digital certificate issued for a previous tier.

6. The method of claim 1, wherein each subsequent identity verification process is performed after successfully completing a previous one of the identify verification processes.

7. A non-transitory computer-readable storage medium storing instructions, which, when executed on a processor, performs an operation for issuing a sequence of digital certificates to a requesting party, the operation comprising:

in response to receiving, by a certificate authority, a request for a digital certificate having a specified certificate type:
performing an initial identity verification process associated with an initial tier of digital certificates issued by the certificate authority, wherein the initial tier of digital certificates precedes a tier associated with the specified certificate type,
upon successfully completing the initial identity verification process, issuing a digital certificate with a certificate type corresponding to the initial tier,
performing one or more subsequent identity verification processes, wherein each subsequent identity verification process is associated with a subsequent tier of digital certificates issued by the certificate authority, and
upon successfully completing each subsequent identity verification process, issuing a digital certificate corresponding to the subsequent tier, until successfully completing an identity verification process associated with the specified certificate type and issuing a digital certificate having the specified certificate type, wherein each digital certificate is provisioned on a server having a network domain and allows the server to establish secure network connections.

8. The computer-readable storage medium of claim 7, wherein the initial tier of digital certificates comprise Domain Validation (DV) certificates and wherein the initial identity verification process comprises receiving an indication verifying that the requesting party controls the network domain to be named in the DV certificate.

9. The computer-readable storage medium of claim 7, wherein a first subsequent tier of digital certificates comprises Organization Validation (OV) certificates and wherein the subsequent identity verification process associated with the first subsequent tier of digital certificates comprises receiving a verification that an organization to be named in the OV certificate exists as stated in enrollment data provided by the requesting party.

10. The computer-readable storage medium of claim 7, wherein a second subsequent tier of digital certificates comprises Extended Validation (EV) certificates and wherein the subsequent identity verification process associated with the second subsequent tier of digital certificates comprises receiving a verification that an individual submitting the request on behalf of an organization to be named in the OV certificate is authorized by the organization to submit the request.

11. The computer-readable storage medium of claim 7, wherein the operation further comprises, after completing one of the subsequent identity verification processes and issuing the digital certificate corresponding to the associated tier of digital certificates, revoking a digital certificate issued for a previous tier.

12. The computer-readable storage medium of claim 7, wherein each subsequent identity verification process is performed after successfully completing a previous one of the identify verification processes.

13. A system, comprising:
a processor; and a memory storing one or more application programs configured to perform an operation for issuing a sequence of digital certificates to a requesting party, the operation comprising:
  in response to receiving, by a certificate authority via the processor, a request for a digital certificate having a specified certificate type:
    performing an initial identity verification process associated with an initial tier of digital certificates issued by the certificate authority, wherein the initial tier of digital certificates precedes a tier associated with the specified certificate type;
    upon successfully completing the initial identity verification process, issuing a digital certificate with a certificate type corresponding to the initial tier;
    performing one or more subsequent identity verification processes, wherein each subsequent identity verification process is associated with a subsequent tier of digital certificates issued by the certificate authority; and
upon successfully completing each subsequent identity verification process, issuing a digital certificate corresponding to the subsequent tier, until successfully completing an identity verification process associated with the specified certificate type and issuing a digital certificate having the specified certificate type, wherein each digital certificate is provisioned on a server having a network domain and allows the server to establish secure network connections.

14. The system of claim 13, wherein the initial tier of digital certificates comprise Domain Validation (DV) certificates and wherein the initial identity verification process comprises receiving an indication verifying that the requesting party controls the network domain to be named in the DV certificate.

15. The system of claim 13, wherein a first subsequent tier of digital certificates comprises Organization Validation (OV) certificates and wherein the subsequent identity verification process associated with the first subsequent tier of digital certificates comprises receiving a verification that an organization to be named in the OV certificate exists as stated in enrollment data provided by the requesting party.

16. The system of claim 13, wherein a second subsequent tier of digital certificates comprises Extended Validation (EV) certificates and wherein the subsequent identity verification process associated with the second subsequent tier of digital certificates comprises receiving a verification that an individual submitting the request on behalf of an organization to be named in the OV certificate is authorized by the organization to submit the request.

17. The system of claim 13, wherein the operation further comprises, after completing one of the subsequent identity verification processes and issuing the digital certificate corresponding to the associated tier of digital certificates, revoking a digital certificate issued for a previous tier.

18. The system of claim 13, wherein each subsequent identity verification process is performed after successfully completing a previous one of the identify verification processes.

* * * * *